May 14, 1935.  H. C. ABELL  2,001,645
LOCKING DEVICE FOR NUTS, SCREWS, BOLTS, AND THE LIKE
Filed June 27, 1934
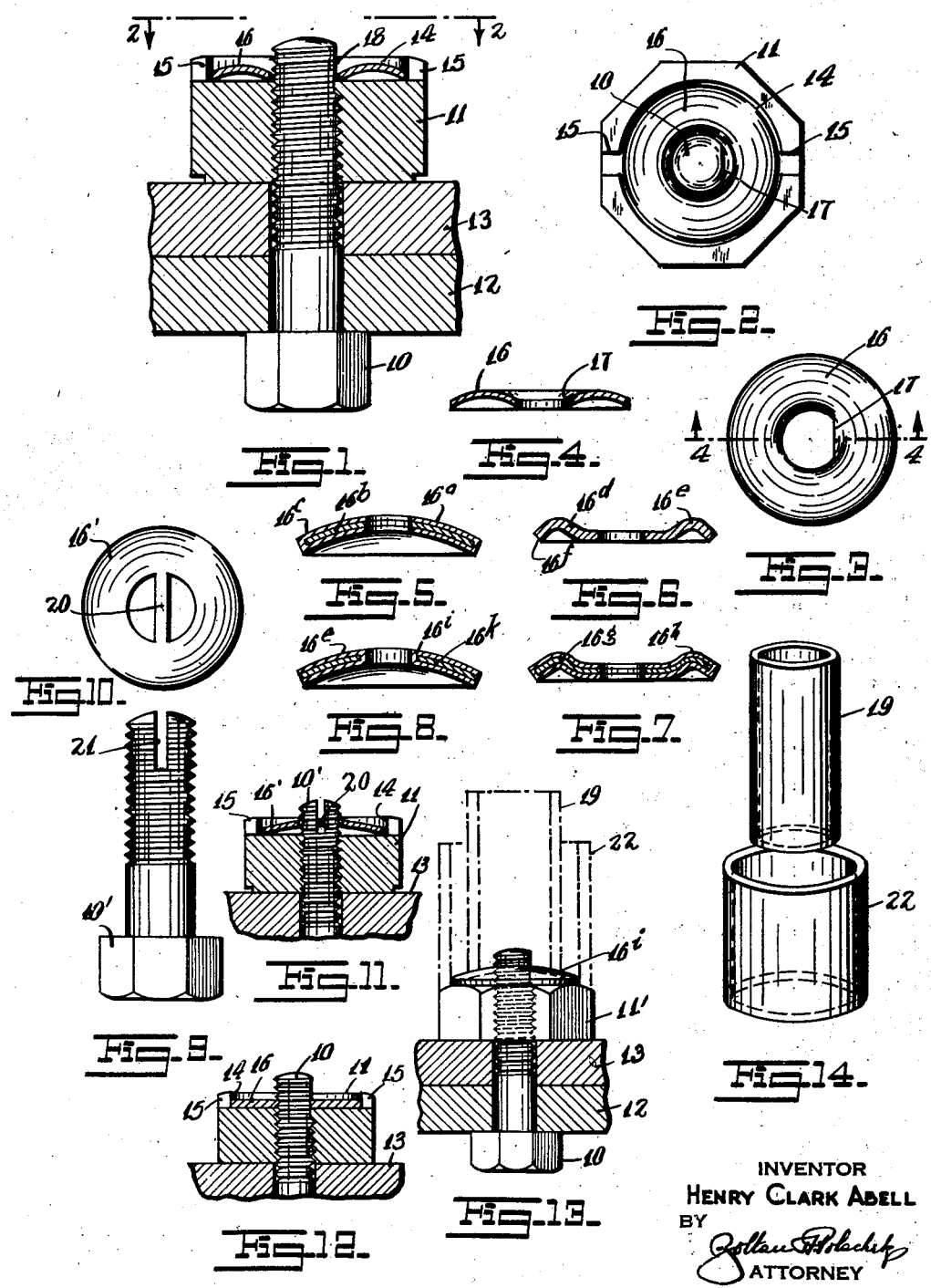
INVENTOR
HENRY CLARK ABELL
BY
ATTORNEY Patented May 14, 1935

2,001,645

UNITED STATES PATENT OFFICE 2,001,645

LOCKING DEVICE FOR NUTS, SCREWS, BOLTS, AND THE LIKE

Henry Clark Abell, Interlaken, N. J.

Application June 27, 1934, Serial No. 732,601

6 Claims. (Cl. 151—30)

This invention relates to new and useful improvements in locking devices for nuts, screws, bolts and the like.

The invention has for an object the construction of a device as mentioned which is characterized by the provision of a curved washer adapted to slidably engage over the threads of a bolt and non-rotatively connected with the bolt and adapted to have its periphery clamped against the walls of a bore when pressed flat in a counter bore of a nut for said bolt.

Still further the invention proposes the provision of radial slots upon the nut arranged in a manner so that a tool may be inserted therein by which the lock washer may be pried loose.

Still further the invention proposes a novel manner for the connection of the curved washer with the bolt in a non-rotative manner, and in a manner which allows sliding of the washer along the bolt.

Still further the invention proposes the construction in a locking device as mentioned, of a curved washer of pliable material with a non-compressible core arranged in a particular manner so that when flattened out its periphery will engage firmly against the counter bore in a nut or the like.

Still further the invention also proposes the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a fragmentary sectional view of a bolt and nut with a locking device according to this invention.

Fig. 2 is an elevational view of the outer end of the nut, per se, seen as though looking in the direction of the line 2—2 of Fig. 1.

Fig. 3 is a plan view of the curved washer per se.

Fig. 4 is a sectional view taken on the line 4—4 of Fig. 3.

Fig. 5 is a view similar to Fig. 4 but illustrating another embodiment of the invention.

Fig. 6 is a sectional view of a curved washer constructed according to a still further embodiment of the invention.

Fig. 7 is a view similar to Fig. 6 but illustrating a still further modified form.

Fig. 8 is a view similar to Fig. 5 but illustrating another embodiment of the invention.

Fig. 9 is an elevational view of a bolt according to another embodiment of the invention.

Fig. 10 is a plan view of a curved washer used in connection with the bolt illustrated in Fig. 9.

Fig. 11 is a fragmentary sectional view of a bolt and nut with a locking device according to a modified form of the invention.

Fig. 12 is a fragmentary sectional view of a bolt and nut illustrated with the locking device in flattened or engaging position.

Fig. 13 is a side elevational view of a bolt and nut with a locking device constructed according to a still further modified form of the invention.

Fig. 14 is a perspective view of tubular members used in engaging the curved washer upon the bolt in a locking position.

The locking device according to this invention is used in combination with a bolt 10 equipped with a nut 11. The bolt is shown engaged through plates 12 and 13 and the nut 11 is shown threadedly engaged upon the bolt as though in the operation of holding the plates 12 and 13 together. The nut 11 is formed with a counter-bore 14 connecting with a pair of diametrically opposite radial grooves 15. A curved washer 16 is formed with a central opening so as to be slidably engageable over the threads of the bolt 10 and is of arcuate shape in radial cross section and arranged with the inner, outer diameters on a common plane.

The washer 16 is constructed to be nonrotative upon the bolt. More particularly it is formed with a central opening having a flat side 17, and the bolt 10 is constructed with a flat side 18 adapted to coact with the flat side 17 so as to prevent rotation of the washer while allowing sliding of the washer along the bolt. The washer 16 is made from pliable material so as to maintain positions into which it is bent or forced. The periphery of the washer 16 is adapted to clamp against the walls of the bore 14 when pressed flat. The washer 16 is placed in position upon the nut so as to be concaved outwardly. The arrangement is such that a tubular member, such as tubular member 19 illustrated in Fig. 11, may be engaged over the end of the bolt and hammered to cause the curved washer to be flattened out in a manner so that its periphery clamps against the wall of the bore. The purpose of the radial slots 15 is that in the event it is desired to remove the locking washer a tool with a point may be engaged beneath the edge of the washer and the washer pried from its gripping position.

In Fig. 5 a modified form of washer 16a is illustrated which distinguishes from the previous arrangement in that it has a non-compressible core 16b, and covering material 16c of pliable substance. For example, the core 16b may be constructed of spring steel while the covering material 16c may be constructed of copper lead, or other pliable material. The washer should be so designed that the pliable material 16c is capable of holding the non-compressible material 16b in various conditions, for example, if the curved washer is hammered flat the pliable material is capable of holding the non-compressible material 16b in the flat condition. It is a feature of this invention that the non-compressible core 16b has one edge flush with the central opening of the washer while its periphery is spaced from the periphery of the pliable material so that the pliable material will be clamped against the wall of a bore when the washer is used upon a bolt and nut as described relative to the washer 16.

In Fig 6 another embodiment of the invention is disclosed in which a washer 16d is illustrated which is substantially the same as the washer shown in Fig. 4 except for the fact that it is of different shape. It is pointed out that the washer 16d is of pliable material and may be flattened out when desired to cause its periphery to grip the wall of a bore. The central area of the washer 16d is flat as clearly illustrated in Fig. 6. It is provided with an annular raised portion 16e from which a downward inclination portion extends. This downward inclined portion terminates in the periphery 16f. This type of a curved washer is used as before described with respect to washer 16, but the annular raised portion 16e is hammered flat so as to cause the periphery 16f to engage against the wall of the bore.

In Fig. 7 another embodiment of washer is disclosed which is of a shape identical to the shape illustrated in Fig. 6, but distinguishes in the fact that the washer comprises a non-compressible core 16g and pliable covering material 16h. The core 16g is arranged so that its central opening is aligned with central opening of the washer, while its periphery is spaced from the periphery of the pliable material so that the pliable material exists between the periphery of the non-compressible core and the wall of the bore when the washer is used.

In Fig. 8 a detail of the washer 16i is shown and it should be noticed that it comprises a non-compressible core 16k and pliable covering material 16l. The non-compressible core 16k has its periphery corresponding with the periphery of the pliable material 16l but has an inner diameter spaced from the inner diameter of the pliable material so that there is some pliable material engaging against the bolt when the washer is hammered flat.

In Figs. 9 and 10 another variation of the invention is disclosed wherein a curved washer 16' is shown formed with a central opening divided into two parts by a transverse bar 20. This type of washer is intended to be used with a bolt 10' formed at its end with a slot 21 extended in from the end. The arrangement is such that the washer 16' may be engaged upon the end of the bolt with the bar 20 extending through the slot 21. The application of the bolt and washer is identical to the arrangement illustrated and described relative to Figs. 1 and 2, that is, the device is intended to be used in conjunction with a nut having a counter-bored side.

In Fig. 11 the washer 16' is illustrated in position ready for gripping the bolt 10' and nut 11.

In Fig. 12 the washer 16 is shown in flattened, engaging position.

In Fig. 13 another embodiment of the invention is disclosed in which a bolt 10a is shown provided with a nut 11' of conventional construction distinguishing from the nut 11 in that it is not provided with a counter-bore. A curved pliable material washer 16i is shown engaged upon the end of the bolt and is adapted to hold the nut 11' in position. In this particular case the washer 16i is firmly clamped upon the bolt itself distinguishing from the previous arrangements in which the washer was clamped upon the nut.

The following process is used to clamp the washer 16' upon the end of the bolt. A tubular member 22 is engaged over the washer 16i and has its inner diameter corresponding identically with the outside diameter of the washer. Then a smaller sized tube, such as the tube 19, is engaged over the end of the bolt and may cause the washer 16i to become flat by manual hammering upon the end of the washer. It should be noticed that since the tubular member 22 prevents the pliable curved washer 16i from becoming larger, necessarily when it is flattened out the central portion thereof must become smaller and in this manner it tightly engages itself upon the bolt.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a lock nut construction, the combination of a bolt, a nut on said bolt having a counter-bore at its outer face, a curved washer slidable over the threads of said bolt and non-rotatively connected with said bolt, said curved washer being arcuate shape in radial cross section and having the inner and outer diameters initially on a common plane, and adapted to have its inner and outer diameters clamped against the walls of said bolt and bore respectively when pressed flat in said counter-bore.

2. In a lock nut construction, a curved washer adapted to slidably engage over the threads of a bolt and non-rotatively connected with said bolt and adapted to have its periphery clamped against the walls of a bore in a nut engaged upon said bolt when pressed flat in said bore, said washer being of pliable material.

3. In a lock nut construction, a curved washer adapted to slidably engage over the threads of a bolt and non-rotatively connected with said bolt and adapted to have its periphery clamped against the walls of a bore in a nut engaged upon said bolt when pressed flat in said bore, said curved portion having a non-compressible core and compressible covering material.

4. In a lock nut construction, a curved washer adapted to slidably engage over the threads of a bolt and non-rotatively connected with said bolt and adapted to have its periphery clamped against the walls of a bore in a nut engaged upon said bolt when pressed flat in said bore, said curved portion having a non-compressible core and compressible covering material, the inner edges of the compressible and pliable material being aligned with each other but the outer edge of the pliable material extending from the outer edge of said non-compressible core so that pliable material exists between the periphery of the core and the wall of said core when said curved washer is engaged in place.

5. In a locked nut construction, a curved washer adapted to slidably engage over the threads of a bolt and adapted to have its periphery held and hammered flat so as to grip said bolt, and having a core of non-compressible material and pliable covering material over said core, said pliable covering material being arranged so as to be positioned between the bore and the non-compressible core.

6. In a locked nut construction, a curved washer adapted to slidably engage over the threads of a bolt and adapted to have its periphery held and hammered flat so as to grip said bolt, and having a core of non-compressible material and pliable covering material over said core, said pliable covering material being arranged so as to be positioned between the bore and the non-compressible core, and the outer diameters of the core and the pliable material being flush with each other.

HENRY CLARK ABELL.